United States Patent [19]
Okuyuma

[11] Patent Number: 6,139,157
[45] Date of Patent: Oct. 31, 2000

[54] ILLUMINATING APPARATUS AND PROJECTING APPARATUS

[75] Inventor: Atsushi Okuyuma, Tokorozawa, Japan

[73] Assignee: Canon Kabushiki Kaisha, Tokyo, Japan

[21] Appl. No.: 09/025,634

[22] Filed: Feb. 18, 1998

[30] Foreign Application Priority Data

Feb. 19, 1997 [JP] Japan .................................. 9-050915

[51] Int. Cl.$^7$ .................................................. G03B 21/14
[52] U.S. Cl. ........................... 353/102; 353/20; 353/122
[58] Field of Search .............................. 353/102, 20, 99, 353/98, 122, 31; 349/5, 8, 9; 385/146, 147, 894, 900, 503

[56] References Cited

U.S. PATENT DOCUMENTS

| | | | |
|---|---|---|---|
| 5,059,013 | 10/1991 | Jain | 385/146 |
| 5,283,600 | 2/1994 | Imai | 353/20 |
| 5,459,592 | 10/1995 | Shibatani et al. | 359/40 |
| 5,513,023 | 4/1996 | Fritz et al. | |
| 5,625,738 | 4/1997 | Magarill | 385/146 |
| 5,634,704 | 6/1997 | Shikama et al. | 353/102 |
| 5,748,376 | 5/1998 | Lin et al. | 349/5 |
| 5,772,299 | 6/1998 | Koo et al. | 353/20 |
| 5,777,789 | 7/1998 | Chiu et al. | 353/37 |
| 5,829,858 | 11/1998 | Levis et al. | 353/122 |
| 5,884,991 | 3/1999 | Levis et al. | 353/20 |

FOREIGN PATENT DOCUMENTS

| | | |
|---|---|---|
| 61-90584 | 5/1986 | Japan . |
| 8-304739 | 11/1996 | Japan . |

*Primary Examiner*—William Dowling
*Attorney, Agent, or Firm*—Fitzpatrick, Cella, Harper & Scinto

[57] ABSTRACT

An illuminating apparatus includes an inner surface reflection type integrator, a condensing optical system for condensing light from a light source on or near the light incidence portion of the integrator, and an imaging optical system for imaging the light emergence portion of the integrator or the vicinity thereof on a surface to be illuminating. The integrator reflects at least part of light which has entered the interior thereof from the light incidence portion thereof by the inner surface thereof to thereby propagate it to the light emergence portion thereof, thereby forming light of which the intensity distribution has been uniformized on or near the light emergence portion. The imaging optical system has a polarizing beam splitter for dividing the light from the integrator into a plurality of polarized lights differing in the direction of polarization from one another. In addition, a changing member changes the direction of polarization of at least one of the plurality of polarized lights to thereby bring the directions of polarization of the plurality of polarized lights into coincidence with one another, the plurality of polarized lights having had their directions of polarization brought into coincidence with one another being caused to enter the surface to be illuminated.

14 Claims, 11 Drawing Sheets

ILLUMINATING APPARATUS AND PROJECTING APPARATUS

BACKGROUND OF THE INVENTION

1. Field of the Invention

This invention relates to an illuminating apparatus and a projecting apparatus, and particularly is suitable for a liquid crystal projector for enlarging and projecting an image displayed by an image display element utilizing liquid crystal or the like onto a screen or a wall by a projection optical system.

2. Related Background Art

There have heretofore been proposed various liquid crystal projectors for illuminating a liquid crystal panel by a light beam from a light source, and enlarging and projecting image light such as transmitted light or reflected light from the liquid crystal panel onto a screen or a wall by a projection lens.

Usually the liquid crystal panel utilizes the polarizing characteristic of liquid crystal. Therefore, usually, polarizing filters such as a polarizer and an analyzer are provided before and behind the liquid crystal panel. The polarizing filter has the characteristic of transmitting therethrough polarized light polarized in a particular direction of polarization of incident light, and intercepting polarized light of which the direction of polarization is orthogonal thereto. Therefore, the light from the light source utilized in the liquid crystal projector has had at least a half thereof intercepted by the polarizer which is a polarizing filter and thus, the brightness of the image projected onto the screen or the wall has not been sufficient.

Figure 14:
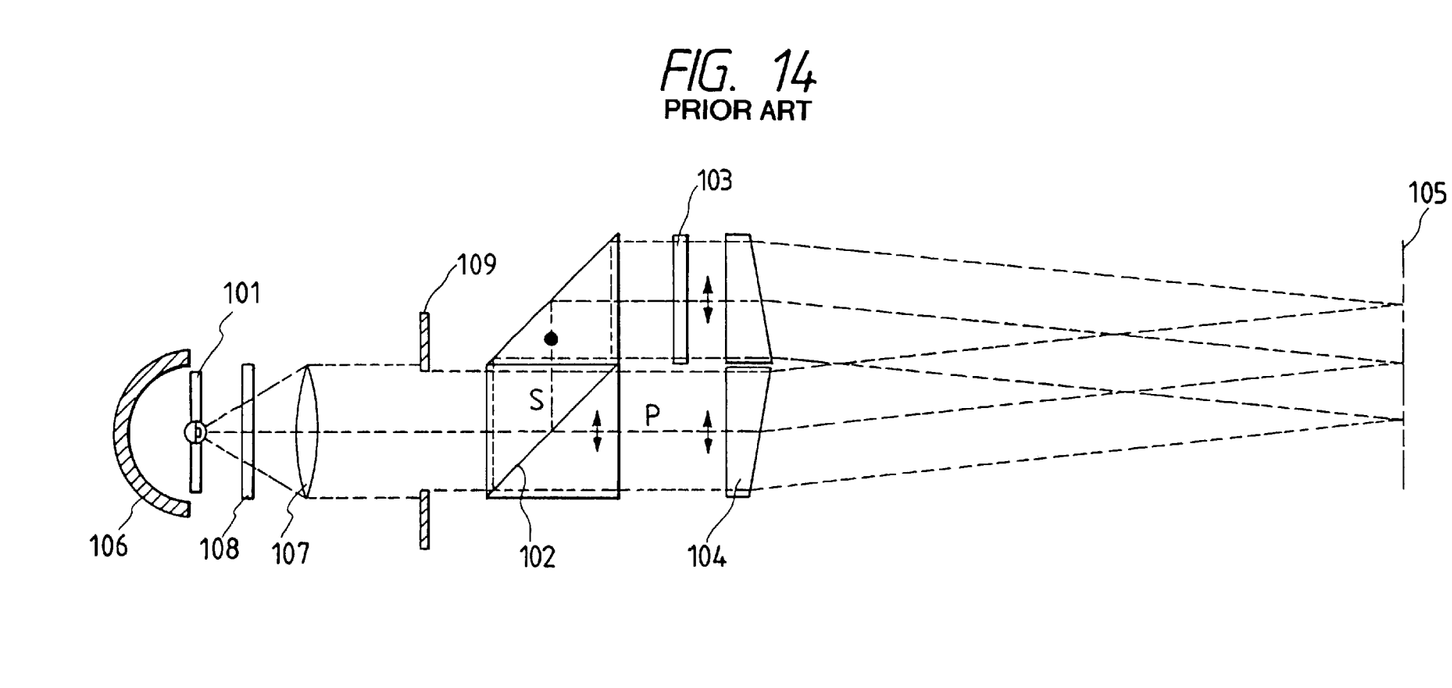
FIG. 14 is a schematic view of the essential portions of a liquid crystal projector according to the prior art.

FIG. 14 of the accompanying drawings is a schematic view of the essential portions of a liquid crystal projector proposed in Japanese Patent Application Laid-open No. 61-90584 which has solved this problem.

In FIG. 14, a light beam emitted from a light source 101 and reflected by a reflector 106 enters a polarization separating element 102 through an infrared cut filter 108, a lens 107 and a stop 109. The polarized component of the incident light is separated into two components (P-polarized light and S-polarized light) orthogonal to each other by the element 102, and the S-polarized component reflected by the element 102 is changed into P-polarized light by a half wavelength plate 103, and the direction of polarization of this P-polarized light is made uniform to that of the P-polarized component transmitted through the element 102. The two P-polarized lights obtained from the polarization separating element 102 and the half wavelength plate 103 are superposed one upon the other on a liquid crystal panel 105 by the use of a prism 104 or the like so that the all lights can be utilized. An image displayed by the liquid crystal panel 105 is projected onto a predetermined surface by a projection lens (not shown).

Figure 15:
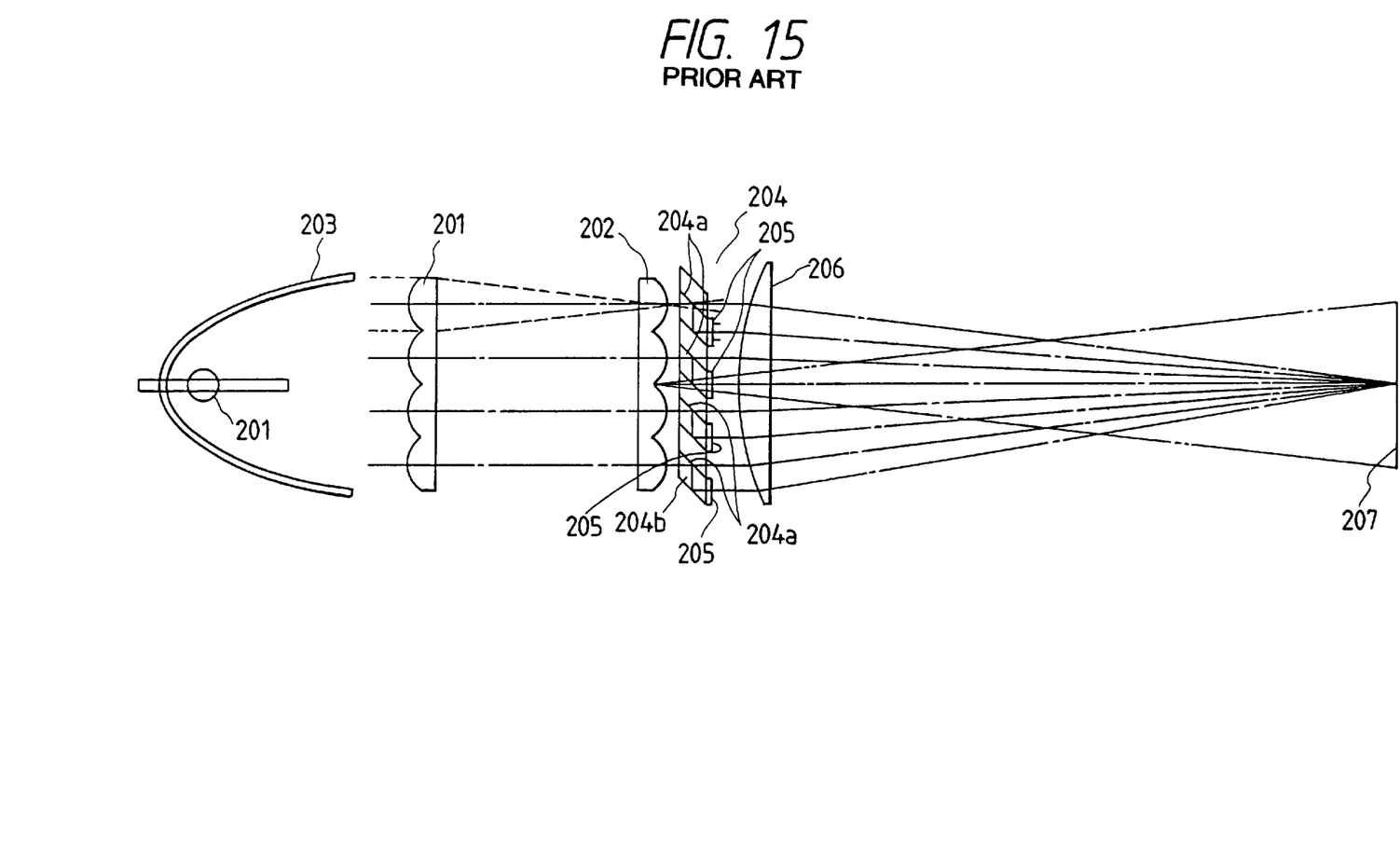
FIG. 15 is a schematic view of the essential portions of another liquid crystal projector according to the prior art.

FIG. 15 of the accompanying drawings is a schematic view of the essential portions of another liquid crystal projector proposed in Japanese Patent Application Laid-open No. 8-304739. In FIG. 15, light emitted by a lamp 201 is reflected toward an image display element 207 by a reflector 203, and enters a first lens array 201 comprising a plurality of lenses arranged into the form of a grating. The aforementioned light is condensed near the lenses of a second lens array 202 similar in construction to the first lens array 201 and comprising lenses having the same degree of focal length as the interval between the first lens array 201 and the second lens array 202 and arranged into the form of a grating by the lenses of the first lens array 201, and is caused to be transmitted through the lenses of the second lens array 202, whereafter it enters a polarization converting element 204.

The light beam which has entered the polarization converting element 204 is separated into different polarized components (S component and P component) by a polarization separating surface 204a, and S-polarized light reflected by the polarization separating surface 204a is reflected by a reflecting mirror 204b and is transmitted through a half wavelength plate 205, whereby it is converted into the same polarized state as the P-polarized light transmitted through the polarization separating surface 204a.

P-polarized light beams having the same directions of polarization which have emerged from the polarization converting element 204 illuminate the image display element 207 provided near the focus position (the surface to be irradiated) of a condensing lens 206, through the condensing lens 206. An image displayed by the image display element 207 is projected onto a predetermined surface by a projection lens.

The liquid crystal projector shown in FIG. 14 does not use a so-called optical integrator and therefore cannot uniformly illuminate a surface 105 to be illuminated.

On the other hand, the liquid crystal projector shown in FIG. 15 forms a plurality of secondary light source images by an optical integrator of the fly-eye type and superpose the light beams from the plurality of secondary light source images one upon another on the surface to be irradiated and therefore can uniformly illuminate the surface 207 to be irradiated.

The liquid crystal projector of FIG. 15, however, requires first and second lens arrays of the same degree of size as an opening in the reflecting mirror 203 and therefore, the entire apparatus has tended to become bulky.

SUMMARY OF THE INVENTION

It is an object of the present invention to provide an illuminating apparatus and a projecting apparatus such as a liquid crystal projector of which the integrator portion is small.

A first aspect of the present invention has an inner surface reflection type integrator, a condensing optical system for condensing light from a light source on or near the light incidence portion of the integrator, and an imaging optical system for imaging the light emergence portion of the integrator or the vicinity thereof on a surface to be illuminated, the integrator reflecting at least part of light which has entered the interior thereof from the light incidence portion thereof by the inner surface thereof to thereby propagate it to the light emergence portion thereof, thereby forming light of which the intensity distribution has been uniformized on or near the light emergence portion, the imaging optical system having a polarizing beam splitter for dividing the light from the integrator into a plurality of polarized lights differing in the direction of polarization from one another, and a changing member for changing the direction of polarization of at least one of the plurality of polarized lights to thereby bring the directions of polarization of the plurality of polarized lights into coincidence with one another, the plurality of polarized lights having had their directions of polarization brought into coincidence with one another being caused to enter the surface to be illuminated.

A second aspect of the present invention has a first imaging optical system for forming the real image of a light source, an inner surface reflecting member for reflecting the light exhaled from the light source image by the inner surface thereof to thereby form a plurality of virtual images of the light source, a second imaging optical system for forming a plurality of real images of the light source by the light from the plurality of virtual images of the light source, a condensing optical system for superposing the light beams from the plurality of real images of the light source one upon another on a surface to be illuminated, and a polarization converting optical system supplied between the second imaging optical system and the condensing optical system, the polarization converting optical system having a polarizing beam splitter for dividing the light from the inner surface reflecting member into a plurality of polarized lights differing in the direction of polarization from one another, and a changing member for changing the direction of polarization of at least one of the plurality of polarized lights to thereby bring the directions of polarization of the plurality of polarized lights into coincidence with one another, the plurality of polarized lights having had their directions of polarization brought into coincidence with one another being caused to enter the condensing optical system.

DESCRIPTION OF THE PREFERRED EMBODIMENTS

Figure 1:
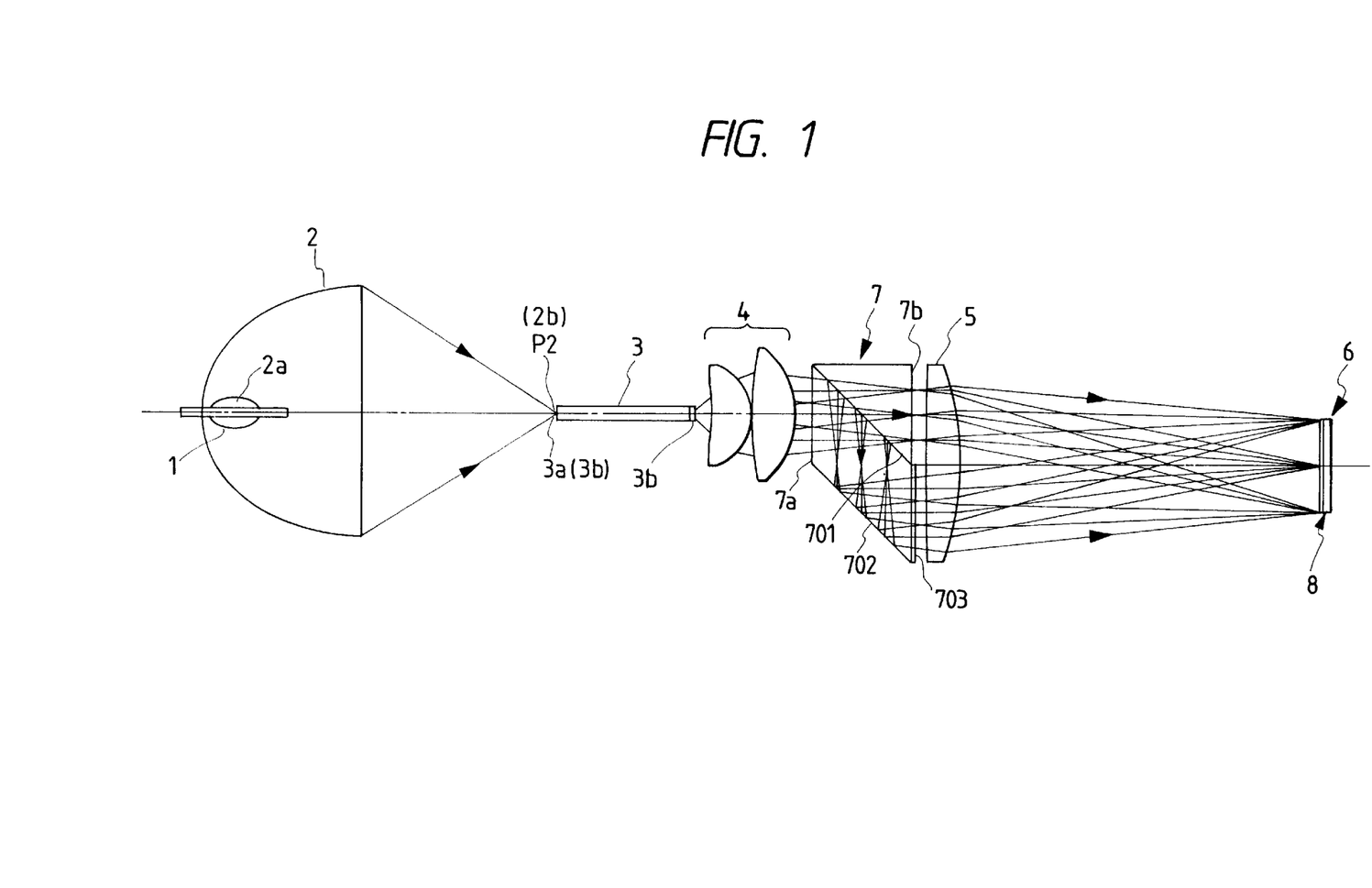
FIG. 1 is a schematic view of the essential portions of Embodiment 1 of the present invention.

FIG. 1 is a schematic view of the essential portions of Embodiment 1 of the illuminating apparatus of the present invention. FIGS. 2A, 2B, 2C, 2D, 3, 4A, 4B, 4C, 5 and 6 are illustrations of portions of FIG. 1. In these figures, the reference numeral 1 designates a white light source disposed on or near one focus 2a of an elliptical mirror 2. The reference numeral 3 denotes a glass rod (light beam dividing means) as an inner surface reflection type integrator comprising a transparent bar-like member of a polygonal (square, hexagonal or the like) cross-sectional shape and having its light incidence surface 3a positioned on or near the other focus 2b of the elliptical mirror 2.

The reference numeral 4 designates an imaging lens which condenses the light beam from the light emergence surface 3b of the glass rod 3 and causes it to enter the incidence surface of a polarization converting element 7. The polarization converting element 7 converts the incident light having a random polarization axis into linearly polarized light polarized in a predetermined direction with efficiency of 100% in principle, and causes the polarized light to emerge from the light emergence surface 7b of the element 7 and directs it to an integrated lens 5. The integrated lens 5 illuminates an image display element 8 comprising a liquid crystal panel disposed on a flat surface 6 to be irradiated with a linearly polarized light beam from the polarization converting element 7 of which the polarized state is uniform.

The light emitted from the white light source 1 disposed on or near a first focus 2a of the elliptical mirror 2 is condensed by the elliptical mirror 2, and a primary light source image (real image) $P_2$ is formed on or near a second focus 2b of the elliptical mirror 2. The light incidence surface 3a of the glass rod 3 is positioned on or near the focus 2b, and a light beam exhaling from the primary light source image $P_2$ enters the interior of the glass rod 3. The inner surface reflecting surface of the glass rod 3 which is a side thereof, i.e., the interface between the glass and the air, reflects this light beam and form a plurality of secondary light source images (virtual images $P_2'$, $P_2''$, ... ) (see FIGS. 2A to 2D).

A plurality of light beams making the plurality of secondary light source images are superposed one upon another on the light emergence surface 3b of the glass rod 3 and emerge from the light emergence surface 3b. The light from the white light source has its light intensity distribution uniformized by this light emergence surface 3b. The plurality of light beams which have emerged from the light emergence surface 3b of the glass rod 3 are condensed toward the element 7 in a state in which the central rays thereof are substantially parallel (telecentric) to the optical axis, and are caused to enter the polarization converting element 7 while forming a plurality of tertiary light source images (real images $P_3$, $P_3'$, $P_3''$, ... ).

The polarization converting element 7, as previously described, converts the incident non-polarized light beam into a linearly polarized light beam polarized in a predetermined direction without any loss of the quantity of light in principle. Also, the integrated lens 5 superposes light beams exhaled from the plurality of tertiary light source images one upon another on the surface of a liquid crystal panel 8 disposed at a predetermined location.

In the present embodiment, by adopting such a construction, the light emitted from the light source 1 is once condensed and the light beam is divided into a plurality by the reflection in the thin bar-like glass rod 3, and the uniformization of the cross-sectional intensity distribution of the light beam is realized. Further, the light beam emerging from the bar-like light beam separating means 3 is condensed by the imaging lens 4 of which the light emergence side having strong refractive power is telecentric, whereby the expause of the light beam is suppressed and a plurality of tertiary light source images are formed on a narrow area.

Here, the polarization converting element 7 having a polarization separating surface is provided near the location at which the tertiary light source images are formed, whereby the polarization converting element is made compact. At this time, the imaging lens 4 is set to a system of which the light emergence side is telecentric, whereby the irregularity of the angle of incidence of each ray of light onto the polarization separating surface is suppressed small to thereby reduce the irregularity of illumination by the incidence angle dependency of the separation characteristic of the polarization separating surface (film).

Further, the separated optical paths are superposed one upon the other on the surface 6 to be irradiated by the integrated lens 5 comprising a single lens or a plurality of lenses and uniform illumination to the liquid crystal panel is effected.

Figure 2A:
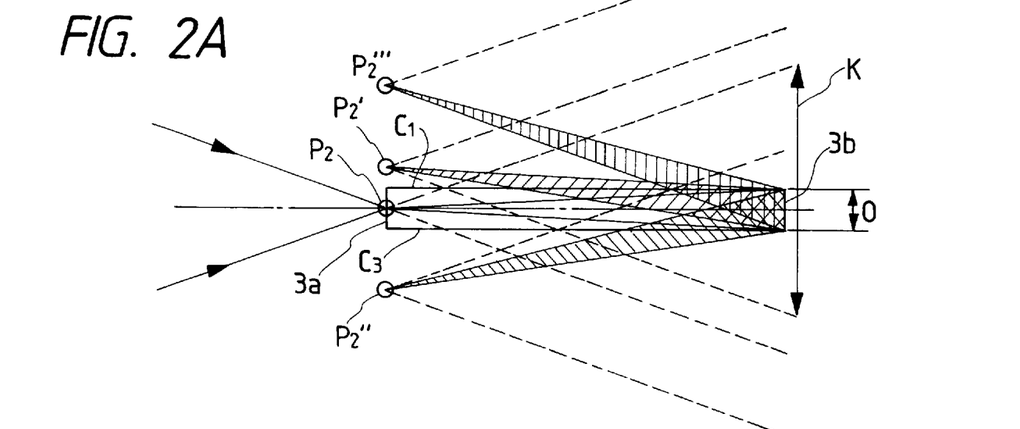
FIGS. 2A, 2B, 2C and 2D are illustrations of portions of FIG. 1.
Figure 2B:
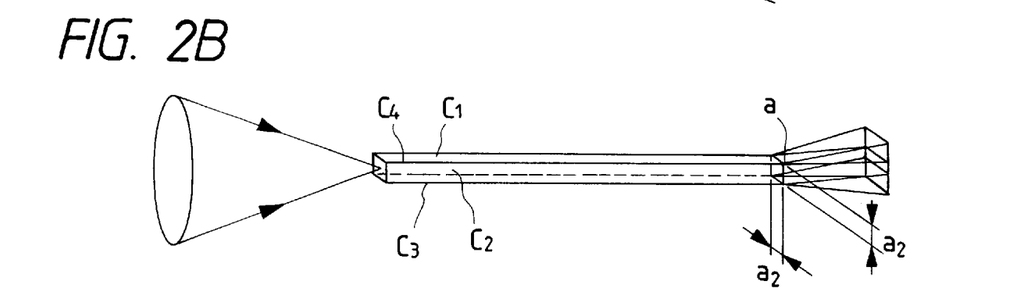
Figure 2C:
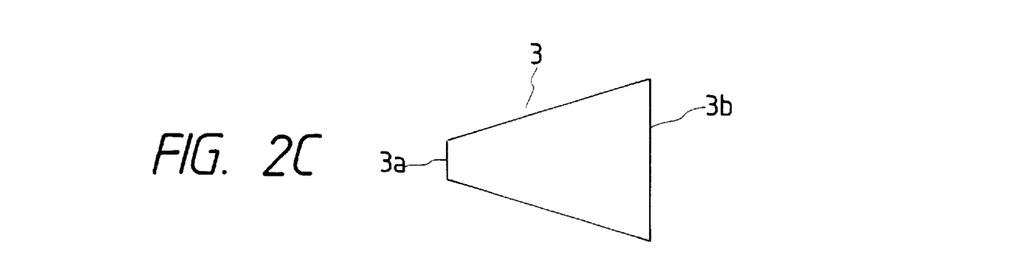

The construction of each element of Embodiment 1 will now be described in detail. FIGS. 2A and 2B are illustrations of the light beam dividing action of the glass rod 3 used in Embodiment 1 which can also be called light beam dividing means.

The cross-sectional shape of the glass rod 3 is a shape in which the shape of the emergence side opening 3b (light emergence surface 3b) is a square having a dimension ax in x-direction and a dimension ay in y-direction and the shape of the incidence side opening 3a (light incidence surface 3a) also is a square in which each side of the opening is parallel to each side of the emergence side opening 3b. The glass rod 3 has four sides ($c_1$, $c_2$, $c_3$ and $c_4$) linking the incidence side opening 3a and the emergence side opening 3b together, and the respective sides provide polished surfaces (inner surface reflecting surfaces). By setting the size 0 of the emergence side opening 3b to a value smaller than the expause k of the divergent light beam from the primary light source image $P_2$ formed in the incidence side opening, a part of a light beam incident of the interior of the glass rod 3 is reflected by the sides ($c_1$, $c_2$, $c_3$ and $c_4$) of the glass rod 3 so that a plurality of virtual images ($P_2'$, $P_2''$, ...) of the primary light source image $P_2$ may be formed by this reflection.

The light beams emerging from the emergence side opening 3b can be considered to be light beams emitted from these virtual images ($P_2'$, $P_2''$, ...) of the primary light source image $P_2$ toward the emergence side opening 3b, and the emitted light beams discontinuously emerge from the emergence side opening 3b in directions conforming to the frequency of reflection on the sides ($c_1$, $c_2$, $c_3$ and $c_4$) In FIGS. 2A to 2D, the virtual image $P_2'$ is one by the reflection on the side $c_1$, the virtual image $P_2''$ is one by the reflection on the sides $c_1$ and $c_3$, and the virtual image $P_2'''$ is one by the reflection on the sides $c_1$, $c_3$ and $c_1$.

Figure 2D:
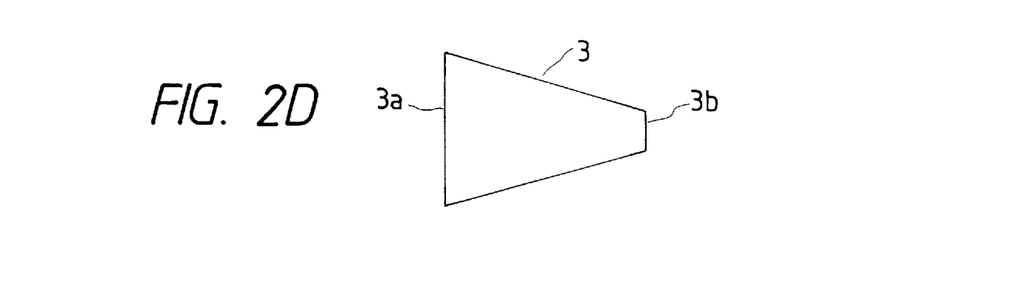

In FIGS. 2A to 2D, the sides of the glass rod 3 are depicted as surfaces perpendicular to the emergence side openings, but even if they are inclined, the angle of the light beam emerging from the emergence side opening only changes and the above-described effect of dividing the light beam is the same. Use may be made of a glass rod of a shape as shown, for example, in FIG. 2C wherein the emergence side opening 3b is large as compared with the incidence side opening 3a, or a glass rod of a shape which is converse to the shape shown in FIG. 2C, as shown in FIG. 2D.

Also, the length of the glass rod 3 in the direction of the optical axis is determined so that the central ray of the light beams from the plurality of virtual images may pass through the center of the emergence side opening (surface) 3b of the glass rod 3.

In the present embodiment, the glass rods as shown in FIGS. 2A to 2D have been shown as the inner surface reflection type integrator, but use may be made of a hollow mirror rod (kaleidoscope) having on the inner surface thereof reflecting surfaces corresponding to the sides $c_1$, $c_2$, $c_3$ and $c_4$ of the glass rod 3.

Also, the shape of the illuminating light beam is determined by the shape of the emergence side opening of the inner surface reflection type integrator and therefore, when an ordinary square image display element is used, the shape of the emergence side opening 3b of the glass rod 3 or the mirror rod should desirably be a square, and at this time, from the ease of manufacture, it is preferable that the shape of the incidence side opening 3a of the glass rod 3 or the mirror rod be such that each side of the opening is parallel to each side of the emergence side opening.

Figure 3:
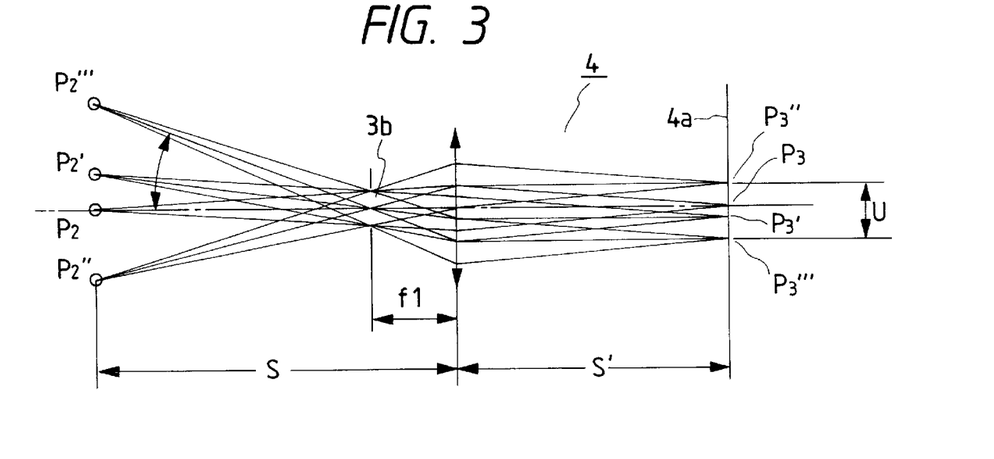
FIG. 3 is an illustration of a portion of FIG. 1.

FIG. 3 is an illustration of the optical action of the imaging lens 4 used in Embodiment 1. In FIG. 3, the imaging lens 4 is represented by a thin lens. As previously described, the light beam emerging from the emergence side opening 3b of the glass rod 3 is a light beam emerging from each of the primary light source image $P_2$ and the secondary light source images which are the virtual images ($P_2'$, $P_2''$, ...) of the primary light source image $P_2$ and passing through the emergence side opening 3b.

These light beams are imaged in a telecentric state by the imaging lens 4 of which the emergence side is telecentric. Specifically, by providing the imaging lens 4 of a focal length $f_1$ at a distance $f_1$ from the emergence side opening 3b of the glass rod 3, the central ray of light passing through the center of the emergence side opening 3b is made into parallel light by the lens 4, whereby each imaging light beam emerging from the emergence side opening 3b is converted into a telecentric state, and tertiary light source images ($P_3$, $P_3'$, $P_3''$, ...) are reduced and imaged at a location 4a of a distance s' from the imaging lens 4. The distance s' is $$s' = s \cdot f_1/(s+f_1)$$

when the distance from the imaging lens 4 to the primary light source image $P_2$ is (<0).

In the actual imaging lens 4, there are aberrations and therefore, the positions of the tertiary light source images are near the location 4a. By the angle θ of the ray of light leaving the virtual image (in FIG. 3, $P_3''$) of the outermost secondary light source image and passing through the emergence side opening 3b of the glass rod 3 with respect to the optical axis and the focal length $f_1$ of the imaging lens 4, the expause u of the group of tertiary light source images is $$u = 2 \cdot f_1 \tan(\theta).$$

By the setting of the focal length $f_1$ and the angle θ, the expause u can be set smaller than the size of the elliptical mirror 2. In the present embodiment, the group of tertiary light source images is formed on such an area u of small expause, and by providing the polarization converting element 7 on that area, the polarization converting element 7 is made compact.

Figure 4A:
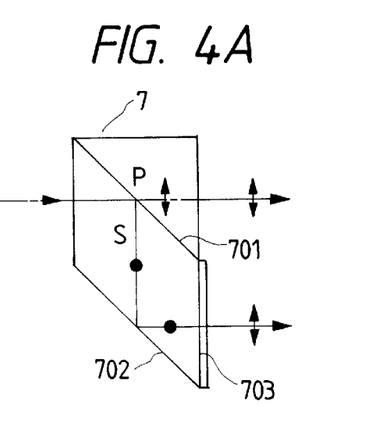
FIGS. 4A, 4B and 4C are illustrations of a portion of FIG. 1.

FIG. 4A is an illustration of the polarization converting element 7 used in Embodiment 1. The polarization converting element 7 in the present embodiment comprises at least one polarization separating surface 701 for separating the incident light beam into discrete optical paths of P-polarized component and S-polarized component, at least one reflecting surface 702 for converting the separated one optical path and the other optical path into the same direction, and at least one half wavelength plate 703 provided in at least one of the optical paths of the separated polarized components for uniformizing the directions of polarization of these two polarized components (lights).

In the present embodiment, the polarization converting element 7 is disposed at such a location as shown in FIG. 1 whereat the light source images become small, whereby the downsizing of the individual parts of the element 7 is achieved.

Figure 4B:
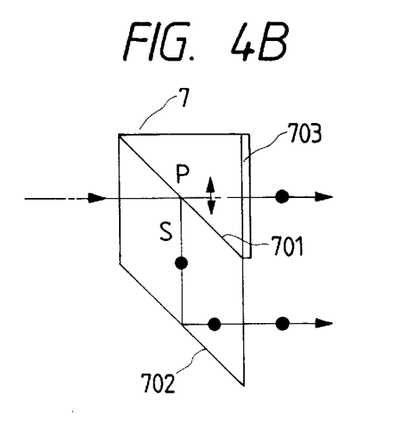
Figure 4C:
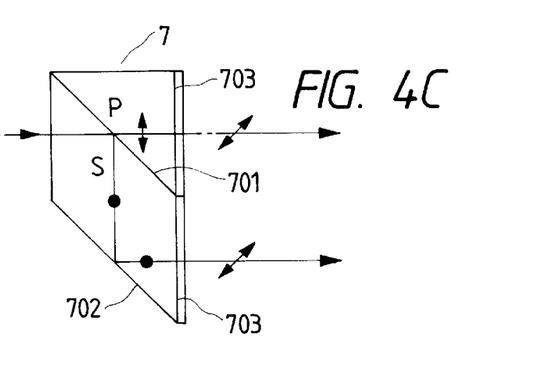

As shown in FIG. 4B, the half wavelength plate 703 may be disposed on the emergence surface lying on the optical path of the P-polarized component. Also, as shown in FIG. 4C, half wavelength plates 703 and 703' may be disposed on the emergence surfaces lying on the optical paths of both of P- and S-polarized components with their optical axes inclined with respect to the directions of polarization of the P- and S-polarized components, whereby linearly polarized lights of which the directions of polarization are identical to each other and which are polarized in a direction differing from the directions of the P- and S-polarized components may be obtained from the emergence surfaces lying on the optical paths of both of P- and S-polarized components.

Figure 5:
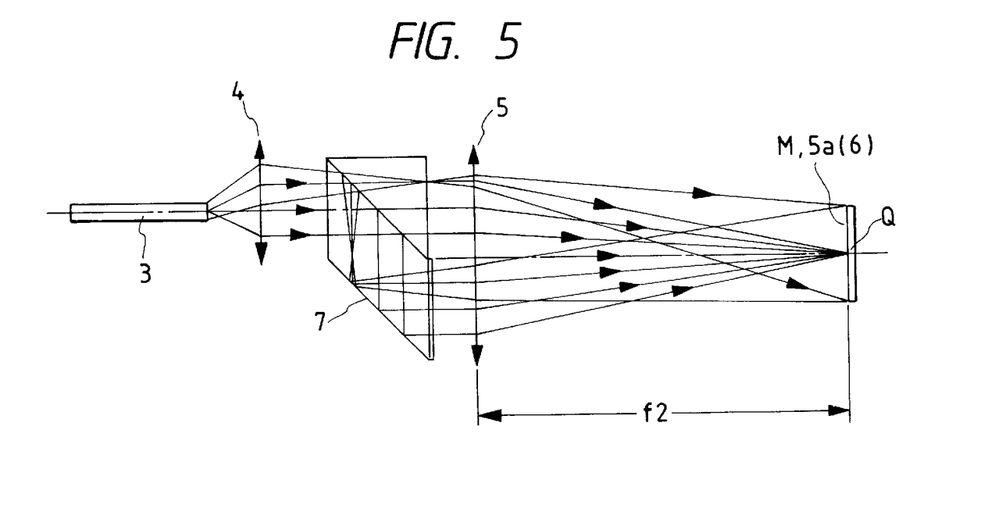
FIG. 5 is an illustration of a portion of FIG. 1.

FIG. 5 is an illustration of the optical action of the integrated lens 5 used in Embodiment 1. In FIG. 5, the central rays of the light beams forming the tertiary light source images which are transmitted chiefly through the polarization converting element 7 are drawn into a figure and the expause of the light beam is represented with respect only to a light beam. The imaging lens 4 to the integrated lens 5 are in a telecentric state and therefore, the central rays of the light beams including the reflected light beams separated by the polarization converting element 7 are parallel to each other and parallel to the optical axis.

By the integrated lens 5 of positive refractive power being provided in the optical paths of these light beams, the central rays of these light beams are adjusted to a point Q on the surface 6 to be irradiated. That is, when the focal length of the integrated lens 5 is $f_2$, light beams exhaling from the tertiary light source images doubled by the polarization converting element 7 are superposed one upon another on the liquid crystal panel 8 set at a position 5a of a distance $f_2$ from the integrated lens 5.

In the actual integrated lens 5, due to aberrations, the central rays do not gather strictly at a point Q, but yet it does not particularly pose a problem as an illuminating optical system. Also, the spacing between the imaging lens 4 and the integrated lens 5 does not affect an area M illuminated, but the light beams are always superposed one upon another at the position of the distance $f_2$ from the integrated lens 5.

In the present embodiment, as can be seen from the foregoing description, the emergence side opening 3b of the glass rod 3 and the liquid crystal panel 8 lying on the surface 6 to be irradiated are in conjugate relationship with each other, and the size (area) of the illuminated are M is $(f_2/f_1)$ times as large as the size (area) of the emergence side opening 3b of the glass rod 3.

When $\beta=(f_2/f_1)$, if the illumination lengths in x-direction and y-direction on the surface 6 to be irradiated are $M_x$, and $M_y$, respectively, $M_x=\beta \cdot a_x$, and $M_y=\beta \cdot a_y$.

Figure 6:
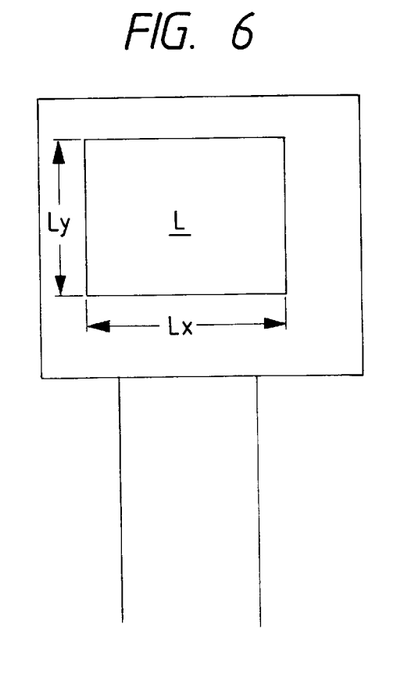
FIG. 6 is an illustration of a portion of FIG. 1.

When as shown in FIG. 6, the effective range, L of the liquid crystal panel 6 is $L_x \times L_y$, the conditions that $1<M_x/L_x<1.5$ $1<M_y/L_y<1.5$ are satisfied.

If the lower limit value of these conditional expressions is exceeded, the illuminated area M will become smaller than the effective range L of the liquid crystal panel 6 and a shadow will be created, and if the upper limit value of these conditional expressions is exceeded, illuminating light which is not utilized will increase and the quantity of light of the projected image will be remarkably reduced, and this is not good.

Figure 7:
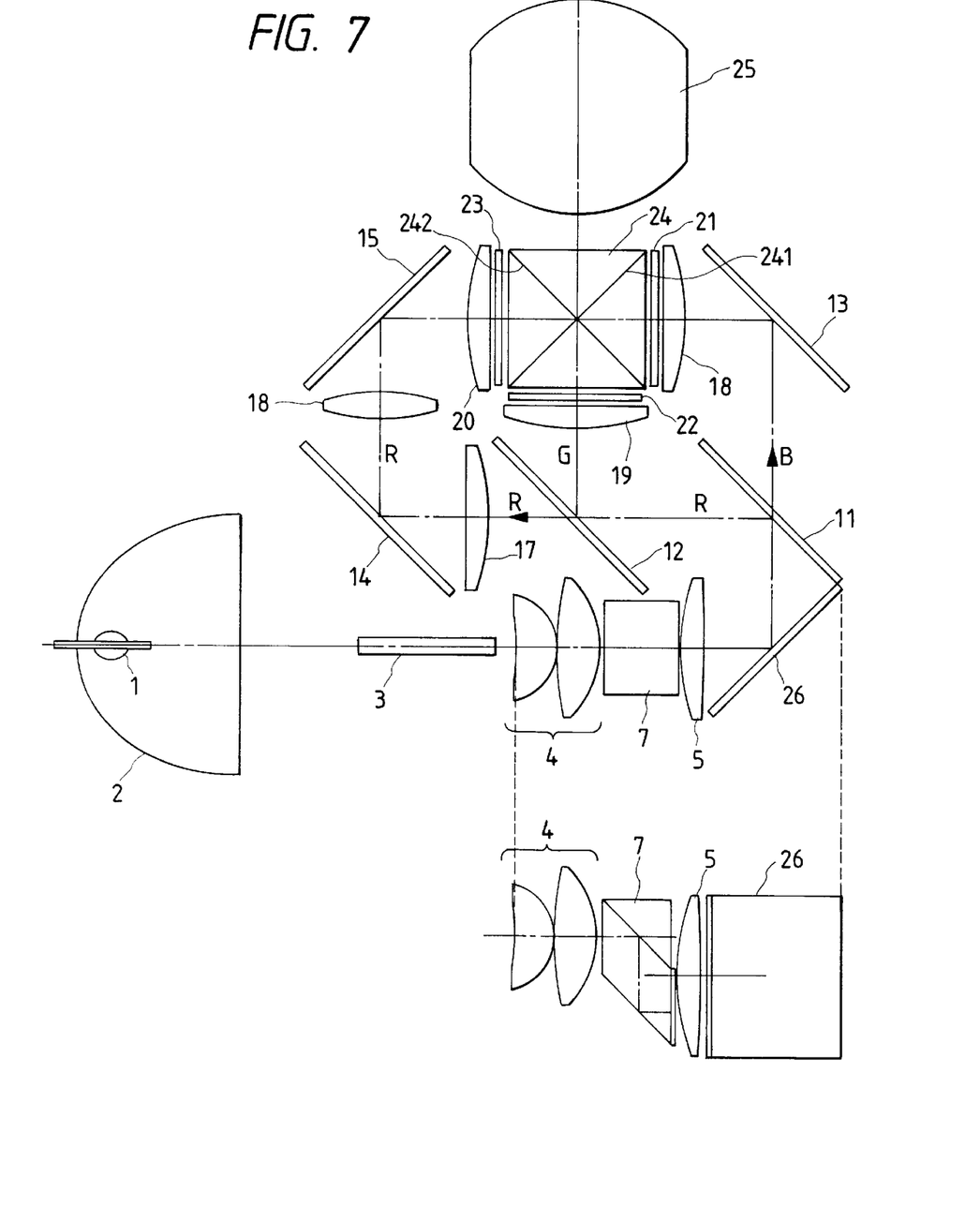
FIG. 7 is a schematic view of Embodiment 2 of the present invention when the illuminating apparatus of FIG. 1 is applied to a three-plate type color liquid crystal projector.

FIG. 7 is a schematic view of the essential portions of Embodiment 2 of the present invention in which the illuminating apparatus of FIG. 1 is applied to a liquid crystal projector as a projecting apparatus. In FIG. 7, the same elements as those in FIG. 1 are given the same reference numerals as those in FIG. 1. As described with respect to FIG. 1, the light beam from the white light source 1 emerges from the integrated lens 5 as a linearly polarized light beam polarized in a predetermined direction through the elements 2, 3, 4, 7 and 5. This polarized light beam which has emerged from the integrated lens 5 is reflected by a mirror 26 and enters a dichroic mirror 11.

The dichroic mirror 11 transmits a blue light beam (B light) therethrough and reflects a green light beam (G light) and a red light beam (R light). The light beams reflected by the dichroic mirror 11 enter a dichroic mirror 12 reflecting a green light beam and transmitting a red light beam therethrough. The green light beam reflected by the dichroic mirror 12 illuminates a liquid crystal panel 22 for green through a field lens 19.

Also, the red light beam transmitted through the dichroic mirror 12 illuminates a liquid crystal panel 23 for red via a lens 17, a mirror 14, a lens 18, a mirror 15 and a field lens 20. Also, the blue light beam transmitted through the dichroic mirror 11 illuminates a liquid crystal panel 21 for blue via a mirror 13 and the field lens 18.

The light beams transmitted through the respective liquid crystal panels 21, 22 and 23 are modulated by each color image information during the transmission, and the modulated light beams of the respective colors enter a cross dichroic prism 24 and are combined together as a full color image. The cross dichroic prism 24 is comprised of a dichroic mirror 242 transmitting a green light beam therethrough and reflecting a blue light beam and a dichroic mirror 241 transmitting a green light beam therethrough and reflecting a red light beam, the two dichroic mirrors 242 and 241 being combined together into a cruciform shape. The full color image synthesized by the cross dichroic prism 24 is projected onto a screen or a wall by a projection lens 25.

Thus, in the present embodiment, an image display element such as a TN liquid crystal panel is provided on the surface to be illuminated, and as a display element illuminating apparatus when the light transmitted through this image display element is enlarged and projected by a projection lens, use is made of the apparatus described with reference to FIGS. 1 to 6 to thereby realize the downsizing of the projecting apparatus.

Figure 8:
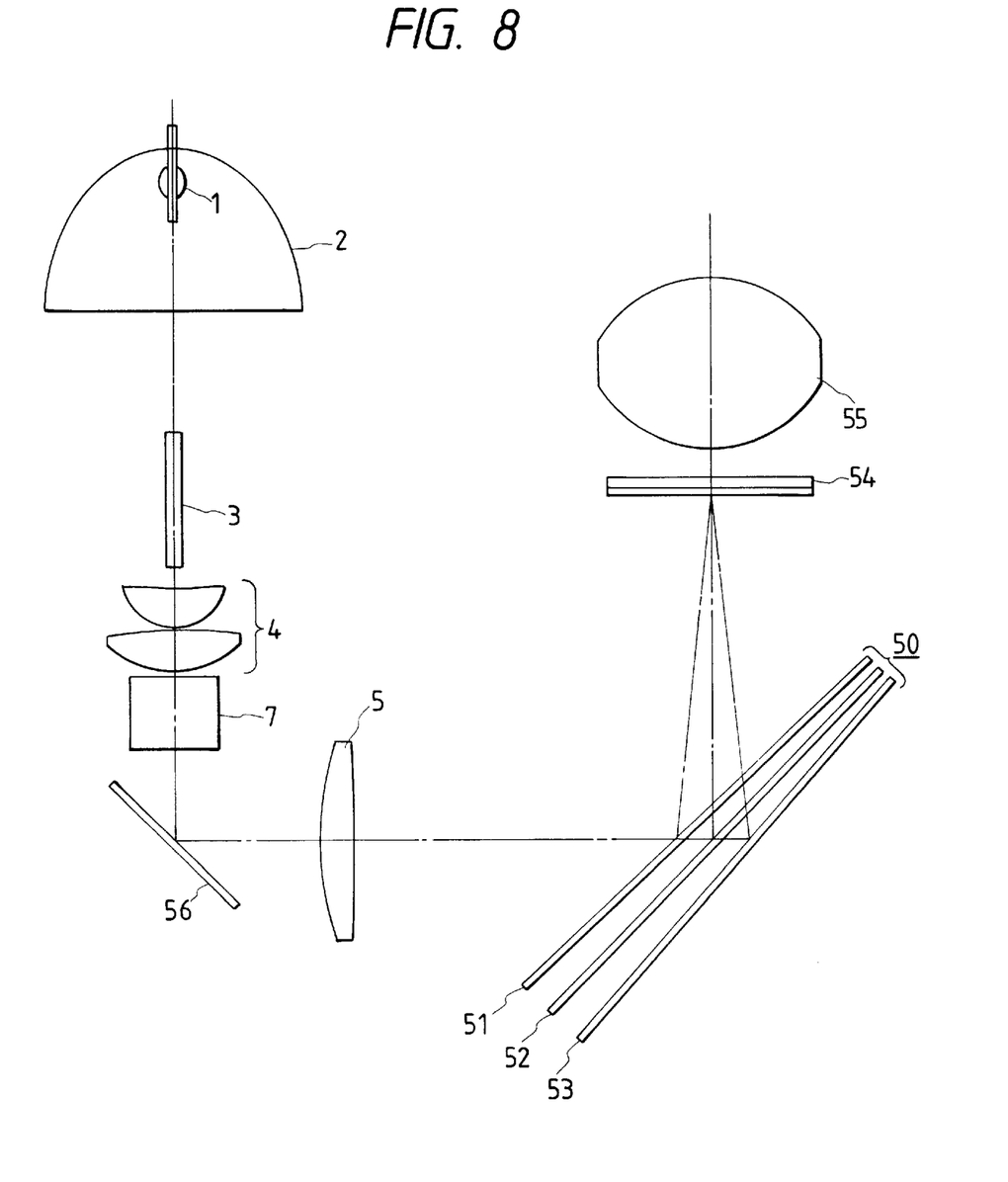
FIG. 8 is a schematic view of the essential portions of Embodiment 3 of the present invention.

FIG. 8 is a schematic view of the essential portions of Embodiment 3 of the present invention in which the illuminating apparatus of FIG. 1 is applied to a liquid crystal projector as a projecting apparatus. In FIG. 8, the same elements as those in FIG. 1 are given the same reference numerals as those in FIG. 1. The reference numeral 56 designates a mirror which is disposed between the polarization converting element 7 and the integrated lens 5 and reflects and deflects a light beam. As described in connection with FIG. 1, the light beam from the white light source 1 emerges from the integrated lens 5 through the elements 2, 3, 4, 7 and 5 as a linearly polarized light beam polarized in a predetermined direction. The light beam which has emerged from the integrated lens 5 enters a color resolving system 50 comprising three dichroic mirrors 51, 52 and 53 each inclined at a predetermined angle. The dichroic mirror 51 has the spectral characteristic of reflecting a light beam of red wavelength band (R light) and transmitting light beams of green and blue wavelength bands therethrough.

The dichroic mirror 52 has the spectral characteristic of reflecting a light beam of green wavelength band (G light) and transmitting a light beam of blue wavelength band therethrough. The dichroic mirror 53 has the spectral characteristic of reflecting a light beam of blue wavelength band (B light). The inclinations of the three dichroic mirrors 51, 52 and 53 are set so that three reflected lights from the color resolving system 50 may become R light, G light and B light differing in the direction of travel from each other and superposed one upon another on a liquid crystal panel 54. Also, the dichroic mirror 53 can be replaced by a mere high reflection mirror.

The color lights from the color resolving system 50 illuminate the same area of the liquid crystal panel 54 at different predetermined angles. Image information (colored image) displayed on the liquid crystal panel 54 is projected onto a screen or a wall by a projection lens 55.

Figure 9:
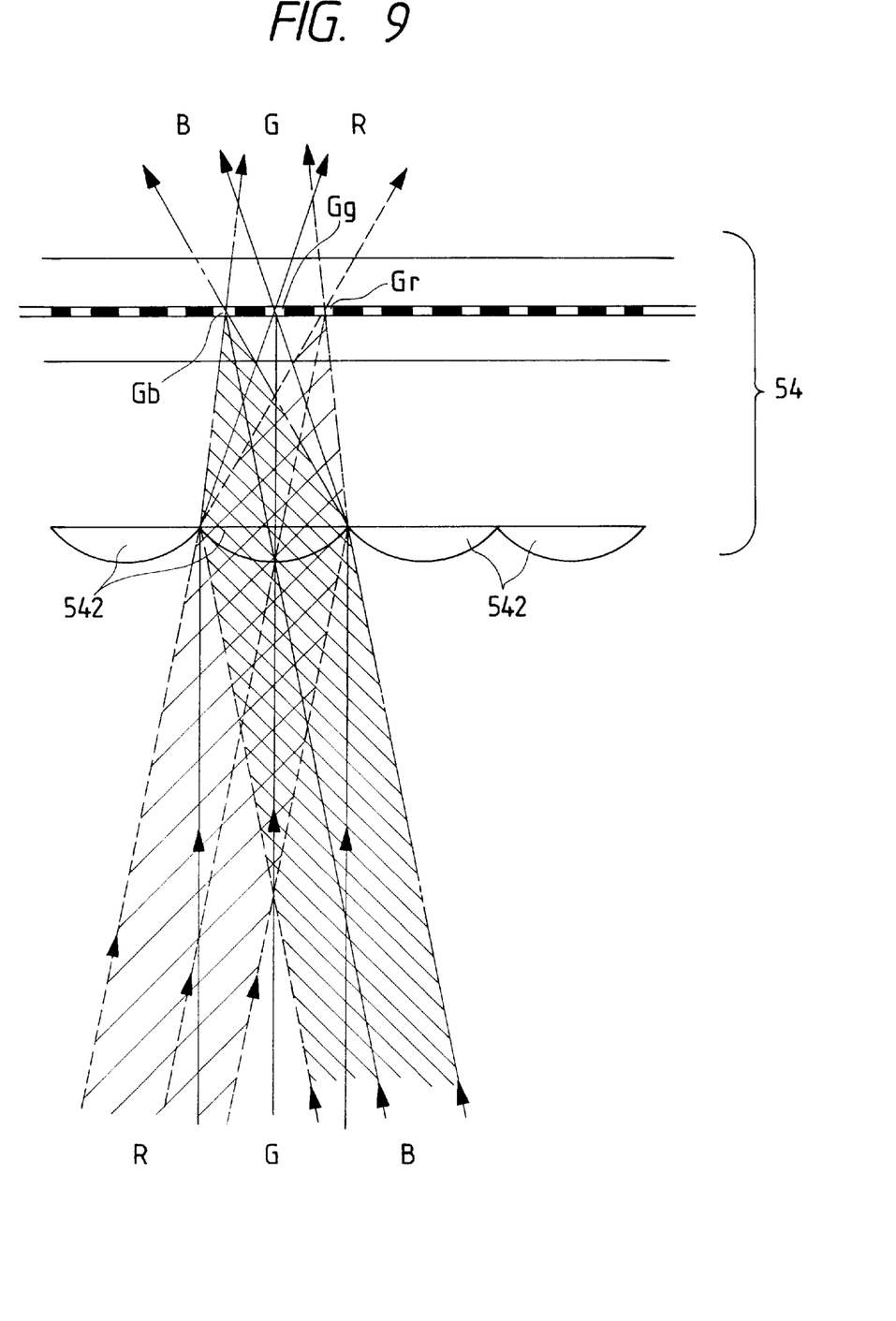
FIG. 9 is an illustration of a portion of FIG. 8.

FIG. 9 is a cross-sectional view of the essential portions of the liquid crystal panel 54 of FIG. 8. The liquid crystal panel 54 in the present embodiment is provided with a microlens 542 for three pixels ($G_r$, $G_g$ and $G_b$) exclusively for the respective colors each forming a picture element of the liquid crystal panel.

In the present embodiment, the light beams of R, G and B colors obtained by the three dichroic mirrors 51, 52 and 53 provided between the integrated lens 5 and the liquid crystal panel 54 illuminated are caused to enter the liquid crystal panel 54 at different angles to thereby cause them to enter the pixels ($G_r$, $G_g$ and $G_b$) exclusively for the respective colors disposed at the imaging positions of the lights of the respective colors R, G and B by the microlenses 542 on the liquid crystal panel 54, and the corresponding color lights are modulated by the pixels exclusively for the respective colors.

FIGS. 10 to 13 are schematic views of the essential portions of other embodiments of the polarization converting element used in the present invention. In FIGS. 10 to 13, the same elements as those shown in FIGS. 1 to 5 are given the same reference numerals as those in FIGS. 1 to 5.

Figure 10:
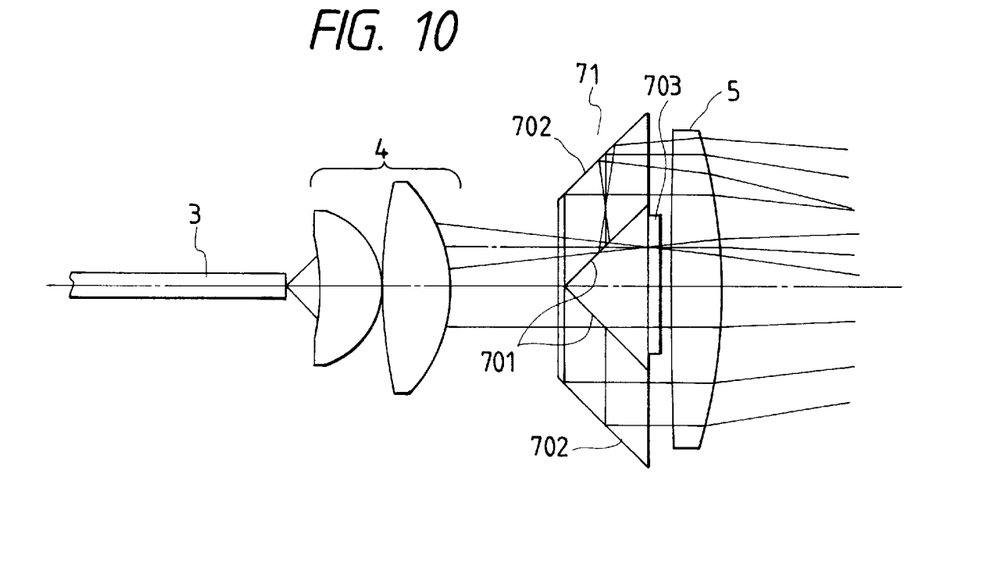
FIG. 10 is an illustration of another embodiment of a portion of the illuminating apparatus of the present invention.
Figure 11:
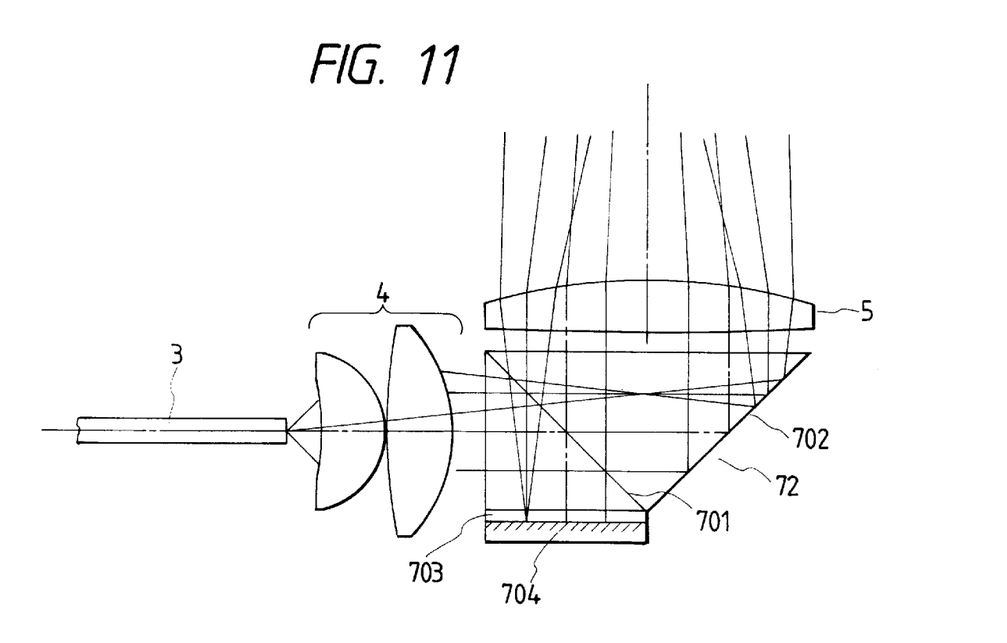
FIG. 11 is an illustration of another embodiment of a portion of the illuminating apparatus of the present invention.

The polarization converting element 71 shown in FIG. 10 has its polarization separating surface 701 formed into a mountain shape, and the thickness thereof in the direction of the optical axis can be reduced to a half relative to the polarization converting element shown in FIG. 1. The polarization converting element 72 shown in FIG. 11 has a quarter wavelength plate 703 and further a reflecting mirror 704 on an optical path reflected by the polarization separating surface 701, and S-polarized light reflected by the polarization separating surface 701 is transmitted through the quarter wavelength plate 703 and is reflected by the reflecting mirror 704 and returns, whereby the direction of polarization thereof is changed to the same direction as P-polarized light. Such a construction is effective when it is necessary to bend the optical path by 90°.

Figures 12, 13:
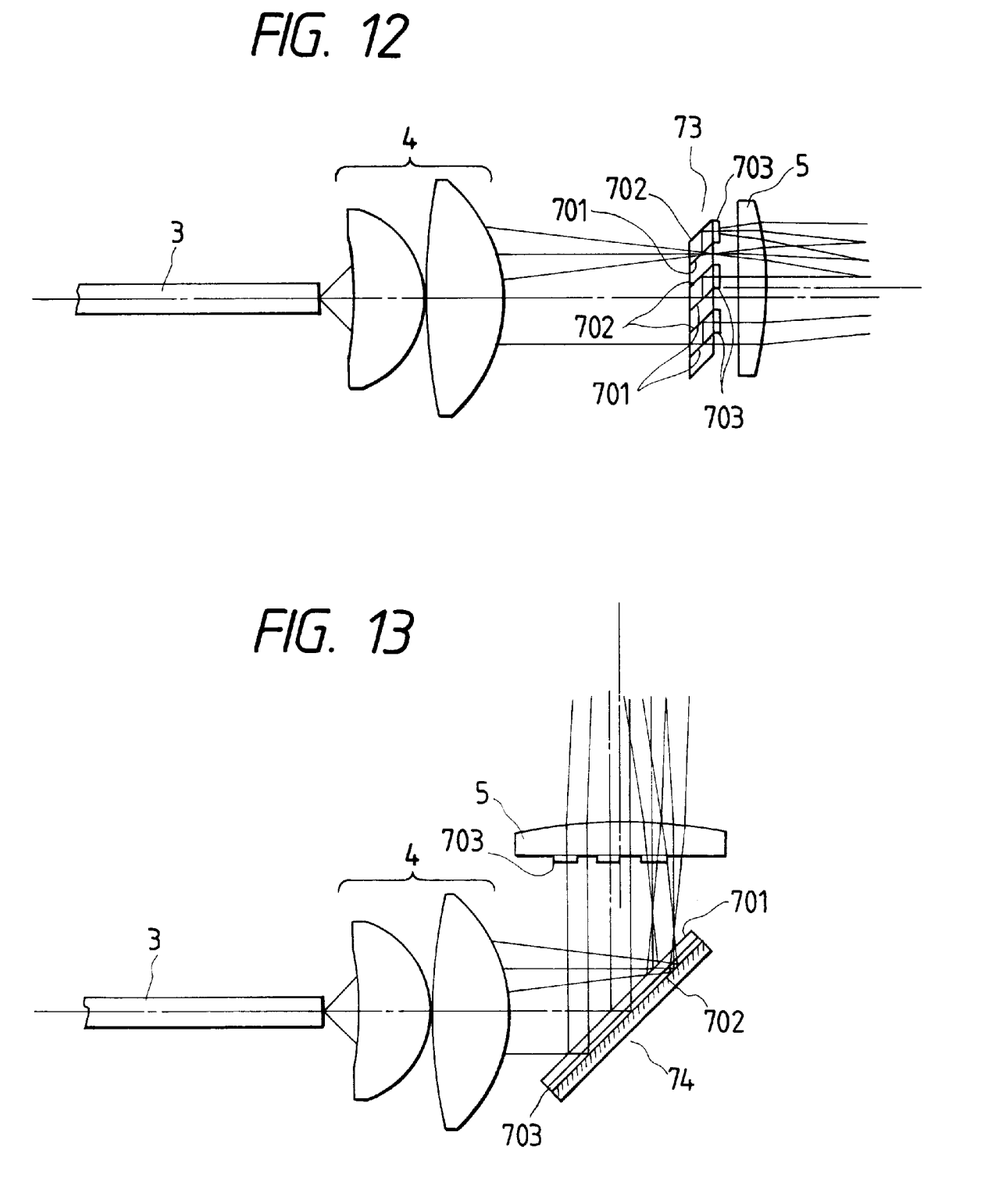
FIG. 12 is an illustration of another embodiment of a portion of the illuminating apparatus of the present invention.
FIG. 13 is an illustration of another embodiment of a portion of the illuminating apparatus of the present invention.

The polarization converting element 73 shown in FIG. 12 is of a construction similar to that of the polarization converting element shown in FIG. 1 for a plurality of light beams from a plurality of virtual images formed by the glass rod described with respect to FIG. 1, and comprises a plurality of small-sized polarization converting elements arranged correspondingly to 1:1, and the size of the polarization converting element can be made further smaller.

The polarization converting element 74 shown in FIG. 13 uses a transparent plate provided with a polarization separating surface 701 on the surface thereof as reflecting means for bending the optical path by 90° and a reflecting mirror 702 on the back thereof, and the optical paths of S-polarized light reflected by the surface and P-polarized light reflected by the back are deviated in parallelism to each other, and a half wavelength plate 703 is disposed on the optical path of the S-polarized light reflected by the surface (or the optical path of the P-polarized light reflected by the back) to thereby uniformize the directions of polarization of the two lights.

Also, in the system of FIG. 13, half wavelength plates 703 are periodically provided on the flat surface of the plano-convex integrated lens 5 to thereby convert the direction of polarization of the incident S-polarized light into the same direction as the P-polarized light.

What is claimed is:

1. An illuminating apparatus comprising:

a first imaging optical system for forming a real image of a light source;

a reflecting member for reflecting light from the real image by an inner surface thereof so that a plurality of virtual images of said light source are formed;

a second imaging optical system for forming a plurality of real images of said light source by light from said plurality of virtual images of the light source, with a diameter of the light forming said plurality of real images being smaller than a diameter of a light emergence portion of said first imaging optical system;

a condensing optical system for superposing light beams from said plurality of real images of the light source one upon another on a surface to be illuminated; and a polarization converting optical system provided between said second imaging optical system and said condensing optical system, said polarization converting optical system having a polarizing beam splitter for dividing light from said second imaging optical system into a plurality of polarized lights differing in the direction of polarization from one another, and a changing member for changing the direction of polarization of at least one of said plurality of polarized lights to thereby bring the directions of polarization of said plurality of polarized lights into coincidence with one another, the plurality of polarized lights having had their directions of polarization brought into coincidence with one another being caused to enter said surface to be illuminated.

2. An apparatus of claim 1, wherein said second imaging optical system is a condensing lens system of which the light emergence side is telecentric.

3. An apparatus of claim 2, wherein said changing member of said polarization converting optical system is a λ/2 plate, with λ being a wavelength.

4. An apparatus of claim 2, wherein said polarization converting optical system has a reflecting member for reflecting one of said polarized light reflected by said polarizing beam splitter and said polarized light transmitted through said polarizing beam splitter to make the optical paths of said reflected polarized light and said transmitted polarized light parallel to each other.

5. An apparatus of claim 2, wherein said polarization converting optical system has one or more polarizing beam splitters, a plurality of changing members and one or more reflecting members.

6. An apparatus of claim 2, wherein said reflecting member is a transparent optical member having a polygonal cross-sectional shape orthogonal to the optical axis of the apparatus and having its side providing said reflecting surface, or a hollow optical member having an inner polygonal cross-sectional shape orthogonal to an optical axis of said apparatus and having its inner side providing said reflecting surface.

7. A projecting apparatus for illuminating a display element such as a liquid crystal panel by the illuminating apparatus of one of claims 1 to 6, and projecting the image light from said display element onto a screen or a wall.

8. An illuminating apparatus comprising:

a reflection member;

a condensing optical system for condensing light from a light source at a light incidence portion of said reflection member; and an imaging optical system for imaging a light emergence portion of said reflection member or a plane of the vicinity thereof on a surface to be illuminated;

said reflection member reflecting at least part of the light which has entered an interior thereof from the light incidence portion thereof by an inner surface thereof to propagate it to the light emergence portion thereof, thereby providing light of which an intensity distribution has been uniformized at said light emergence portion;

said imaging optical system having a first optical system for forming a plurality of images of the light source by light from said reflection member and a second optical system for superposing light beams from said plurality of images of the light source one upon another on said surface to be illuminated, with a diameter of the light forming said plurality of images of the light source being smaller than a diameter of a light emergence portion of said condensing optical system; and a polarization converting optical system provided between said first and second optical systems, said polarization converting optical system having a polarizing beam splitter for dividing the light from said first optical system into a plurality of polarized lights differing in the direction of polarization from one another, and a changing member for changing the direction of polarization of at least one of the plurality of polarized lights to thereby bring the directions of polarization of the plurality of polarized lights into coincidence with one another, the plurality of polarized lights having had their directions of polarization brought into coincidence with one another being caused to enter said surface to be illuminated.

9. An apparatus of claim 8, wherein said first optical system is an optical system of which the light emergence side is telocentric.

10. An apparatus of claim 9, wherein said changing member of said polarization converting optical system is a $\lambda/2$ plate, with $\lambda$ being a wavelength.

11. An apparatus of claim 9, wherein said polarization converting optical system has a reflecting member for reflecting one of the polarized lights reflected by said polarizing beam splitter and the polarized light transmitted through said polarizing beam splitter to make the optical paths of the reflected polarized light and said transmitted polarized light parallel to each other.

12. An apparatus of claim 9, wherein said polarization converting optical system has one or more polarizing beam splitters, a plurality of changing members and one or more reflecting members.

13. An apparatus of claim 9, wherein said reflection member is a transparent optical member having a polygonal cross-sectional shape orthogonal to the optical axis of the apparatus and having its side providing said reflecting surface, or a hollow optical member having an inner polygonal cross-sectional shape orthogonal to an optical axis of said apparatus and having its inner side providing said reflecting surface.

14. A projecting apparatus for illuminating a display element such as a liquid crystal panel by the illuminating apparatus of one of claims 8–13, and projecting the image light from said display element onto a screen or a wall.

* * * * *

UNITED STATES PATENT AND TRADEMARK OFFICE
CERTIFICATE OF CORRECTION

PATENT NO.   : 6,139,157
DATED        : October 31, 2000
INVENTOR(S)  : Atsushi Okuyama It is certified that error appears in the above-identified patent and that said Letters Patent is hereby corrected as shown below:

Title page,
Item [19], UNITED STATES PATENT,
"Okuyuma" should read -- Okuyama --.

Item [75], Inventor,
"Atsushi Okuyuma" should read -- Atsushi Okuyama --.

Column 4,
Line 65, "expause" should read -- expanse --.

Column 5,
Line 32, "expause" should read -- expanse --.

Column 6,
Line 46, "expause" should read -- expanse --.

Column 7,
Line 24, "expause" should read -- expanse --.

Claim 12,
Line 10, "telocentric" should read -- telecentric --.

Signed and Sealed this

Eighteenth Day of December, 2001

Attest:

Attesting Officer

JAMES E. ROGAN
*Director of the United States Patent and Trademark Office*